(12) United States Patent
Li

(10) Patent No.: US 7,573,910 B2
(45) Date of Patent: Aug. 11, 2009

(54) WIRELESS DEVICE WITH DYNAMIC FRAGMENTATION THRESHOLD ADJUSTMENT

(75) Inventor: Pen Li, San Jose, CA (US)

(73) Assignee: NXP B.V., Eindhoven (NL)

( * ) Notice: Subject to any disclaimer, the term of this patent is extended or adjusted under 35 U.S.C. 154(b) by 304 days.

(21) Appl. No.: 10/569,128

(22) PCT Filed: Aug. 25, 2004

(86) PCT No.: PCT/IB2004/051566

§ 371 (c)(1),
(2), (4) Date: Dec. 18, 2006

(87) PCT Pub. No.: WO2005/020522

PCT Pub. Date: Mar. 3, 2005

(65) Prior Publication Data

US 2007/0087782 A1    Apr. 19, 2007

Related U.S. Application Data

(60) Provisional application No. 60/497,996, filed on Aug. 26, 2003.

(51) Int. Cl.
*H04J 3/16* (2006.01)
(52) U.S. Cl. .................. 370/470; 370/464; 370/465; 375/219; 375/222; 375/316; 375/340
(58) Field of Classification Search .......... 370/464, 370/465, 470; 455/39, 41.1, 67.11; 375/219, 375/222, 316, 340
See application file for complete search history.

(56) References Cited

U.S. PATENT DOCUMENTS

| 6,438,119 | B1 * | 8/2002 | Kim et al. | 370/335 |
| 6,661,857 | B1 * | 12/2003 | Webster et al. | 375/350 |
| 2003/0051045 | A1 * | 3/2003 | Connor | 709/236 |
| 2004/0052307 | A1 * | 3/2004 | Godfrey | 375/219 |

FOREIGN PATENT DOCUMENTS

| EP | 0 872 979 | 10/1998 |
| EP | 1 225 736 | 7/2002 |
| EP | 1 315 335 | 5/2003 |
| WO | WO 02/05442 | 1/2002 |
| WO | WO 2004/027565 | 4/2004 |

OTHER PUBLICATIONS

Song Ci et al: "Adaptive Approaches to Enhance Throughput of IEEE 802.11 Wireless Lan With Bursty Channel"; IEEE, Nov. 8, 2000; pp. 44-45.

* cited by examiner

*Primary Examiner*—William Trost, IV
*Assistant Examiner*—Charles C Jiang

(57) ABSTRACT

A wireless communication device includes an input/output terminal. A memory is configured to store parameters relevant to a wireless communication protocol. A modem is coupled to the input/output terminal and the memory and configured to operate a wireless protocol over a wireless channel with other modems based at least in part on the parameters stored in the memory. A logic circuit is coupled to the modem and the memory and configured to receive information related to wireless channel conditions and update at least one parameter in the memory. In one aspect of the invention, the wireless protocol is 802.11. Advantages of the invention include the ability to achieve higher wireless communication throughput due to the dynamic setting of the communication parameters, for example, the fragmentation threshold.

4 Claims, 4 Drawing Sheets

WIRELESS DEVICE WITH DYNAMIC FRAGMENTATION THRESHOLD ADJUSTMENT

CROSS REFERENCE TO RELATED APPLICATION

This application claims the benefit of U.S. provisional application Ser. No. 60/497,996 filed Aug. 26, 2003, which is incorporated herein whole by reference.

The present invention relates to communications in a wireless network. In particular, the invention relates to dynamic fragmentation threshold adjustment in a wireless network.

Wireless communications are becoming very popular because allow users to move freely without being tied to a desk or wire. However, users are continually demanding greater performance and better communication with their wireless devices. Consequently, techniques that improve the performance of wireless devices are extremely useful and may have great commercial value. One aspect that can be improved has to do with the way messages are fragmented so that they may be efficiently communicated between devices.

In wireless communication standards such as 802.11 Wireless Local Area Network (WLAN) standard, a technique called fragmentation divides large messages into smaller fragments so that they can be transmitted efficiently between devices. Ordinarily, the fragment length is fixed, however, the longer the fragments the more likely that they will be corrupted during the communication. On the other hand, the smaller fragmentation length means larger overhead and more transmit and acknowledge (ACK) rounds which will decrease the system throughput. So if the channel condition is good, the longer fragment length will increase the system throughput. Some techniques for manually modifying the fragment size or for dynamically modifying the fragment size are known in the art, but they do not adequately take into account certain channel parameters and variables that would be useful for optimizing the fragment length.

In the 802.11 specification FIG. 1 is provided to show the standard fragmentation process of partitioning a media access control (MAC) service data unit (MSDU) into smaller MAC level frames, MAC protocol data units (MPDUs). Fragmentation creates MPDUs smaller than the original MSDU length to increase reliability, by increasing the probability of successful transmission of the MSDU or MMPDU in cases where channel characteristics limit reception reliability for longer frames.

The invention is directed to a technique for optimizing the fragment length, especially under the 802.11 WLAN standard.

The present invention addresses the identified problems and provides a wireless communication device with a dynamic fragmentation threshold. This dynamic setting allows the wireless communication device to achieve an optimized throughput based on the quality of the wireless communication channel.

A wireless communication device comprises an input/output terminal configured to communicate data with a processor. A memory is configured to store parameters relevant to a wireless communication protocol. A modem is coupled to the input/output terminal and the memory and configured to operate a wireless protocol over a wireless channel with other modems based at least in part on the parameters stored in the memory. A logic circuit is coupled to the modem and the memory and configured to receive information related to wireless channel conditions and update at least one parameter in the memory. In one aspect of the invention, the wireless protocol is 802.11.

In one aspect of the invention, the memory is configured to store a fragmentation threshold, the modem is configured to use the fragmentation threshold to frame outgoing data packets, and the logic circuit is configured to periodically update the fragmentation threshold.

In one aspect of the invention, the information related to wireless channel conditions includes an impulse response signal from the receiver, and the logic circuit is configured to periodically update the fragmentation threshold based at least in part on the impulse response signal.

In one aspect of the invention, the information related to wireless channel conditions includes a frame error rate and impulse response signal from the receiver, and the logic circuit is configured to periodically update the fragmentation threshold based at least in part on the frame error rate and impulse response signal Advantages of the invention include the ability to achieve higher wireless communication throughput due to the dynamic setting of the communication parameters, for example, the fragmentation threshold. This dynamic setting increases communication quality by setting the fragmented packet length to an optimum threshold, thereby increasing throughput while reducing frame error rate over the wireless link.

The invention will be described with reference to the following figures in which.

The invention is described with reference to a number of embodiments, which may include specific implementations. The invention is intended to describe the best mode of the invention, but other similar techniques and technologies can be used to perform the invention. For example, reference is made to the 802.11 wireless protocol, but other protocols may be implemented in the invention. Likewise, while reference is made to a logic circuit for updating modem parameters, the invention can also be performed in software by a processor or other device.

A. Fragmentation Using Wireless Protocol Standard (802.11)

Figure 1:
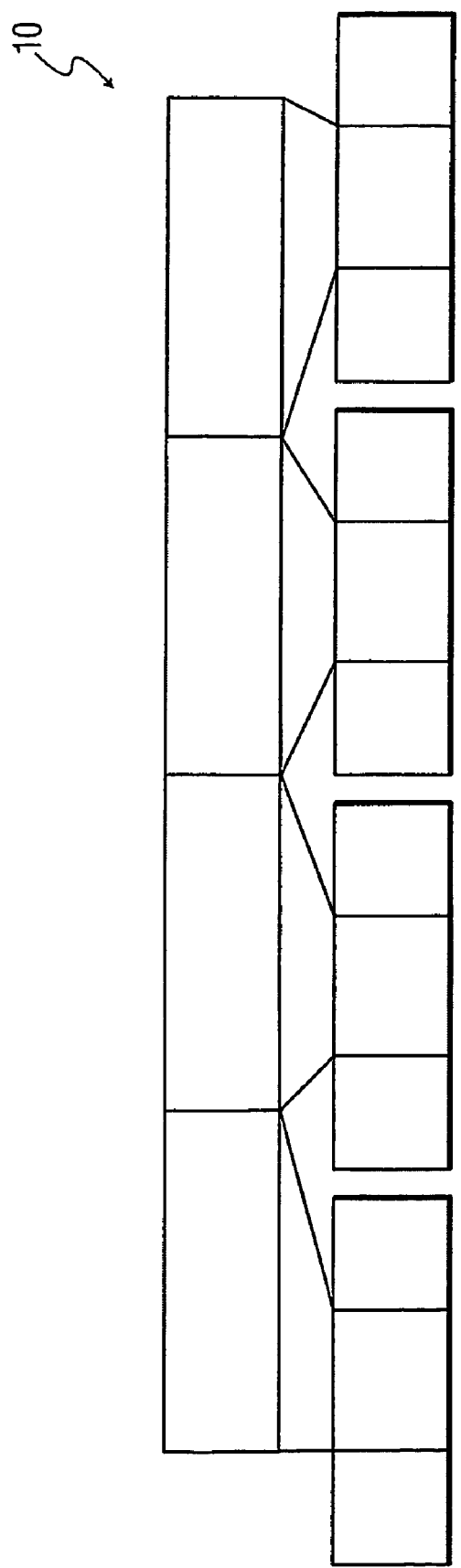
FIG. 1 is a diagram showing fragmentation under the 802.11 communication protocol specification.

As shown in FIG. 1, a media access control (MAC) device may fragment and reassemble directed MAC service data units (MSDUs) or MAC management protocol data units (MMPDUs). Each of these fragments in referred to as a frame in communication between the wireless devices. Fragmentation is described in detail in the 802.11 specification, which is available on the Internet at the IEEE web site, http://www.ieee.org. However, while the specification describes standard techniques for performing fragmentation based on a fragmentation threshold, the specification does not specify or suggest a technique for dynamically setting the fragmentation threshold as described herein.

Figure 2:
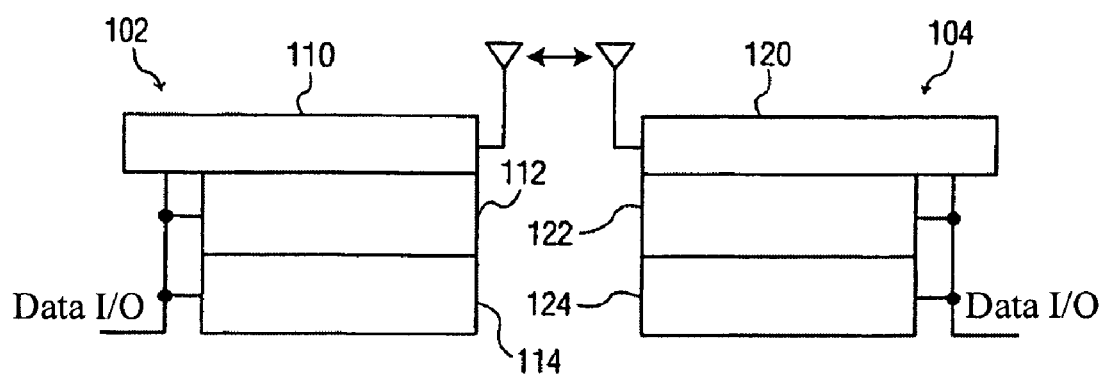
FIG. 2 is a simplified block diagram showing two wireless devices using an exemplary 802.11 WLAN standard according to an embodiment of the invention.

FIG. 2 is a simplified block diagram showing two wireless devices 102 and 104 using an exemplary 802.11 communication protocol according to an embodiment of the invention. The exemplary devices 102 and 104 are the same so reference is made to one of the devices, e.g. 102. A modem 110 is constructed that is coupled to a memory 112 for storing communication parameters and a logic circuit for managing the wireless communication. The invention employs a technique that permits the logic circuit to dynamically set parameter in the memory in order to optimize communication performance, described in detail below.

Figure 3:
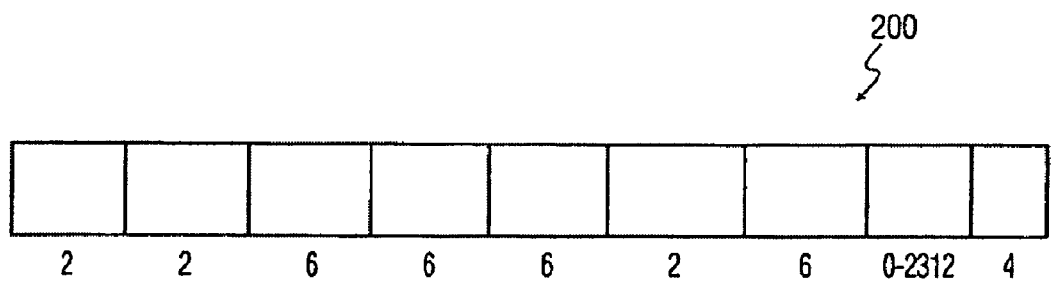
FIG. 3 is an exemplary wireless frame structure according to the 802.11 specification.

FIG. 3 is an exemplary wireless frame 200 according to the 802.11 specification, where the frame represents one of the fragments as described above. The modem 110 performs the fragmentation and constructs the frame including the frame body, which can be 0-2312 bytes long, depending on the fragmentation threshold stored in the memory 112.

B. Channel Parameters and Fragmentation Threshold Computation

Figure 4:
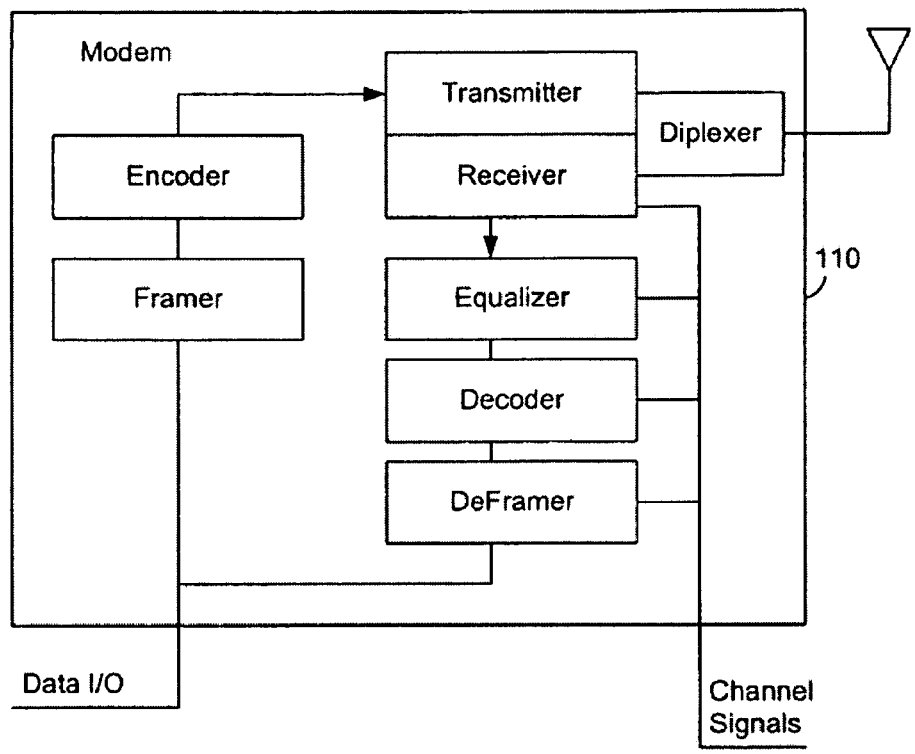
FIG. 4 is a diagram showing an internal functional block diagram of the modem according to an embodiment of the invention.
Figure 5:
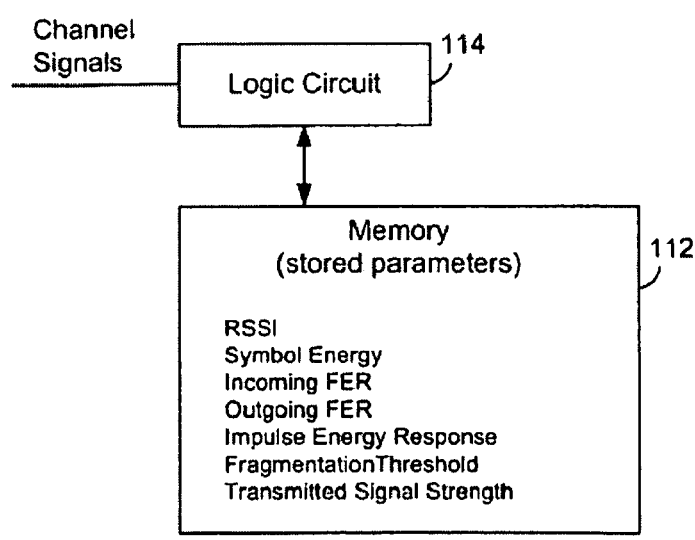
FIG. 5 is a diagram showing an internal functional block diagram of the logic circuit according to an embodiment of the invention.

As described above, the logic circuit 114 periodically set the fragmentation threshold stored in the memory 112. FIGS. 4 and 5 show an internal functional block diagram of the modem according to an embodiment of the invention. The modem 110 includes a number of components, for example, a transmitter and receiver. In addition, the modem includes a decoder, deframer and equalizer, etc. Some of these components is capable of providing a channel related information to imply the quality of communication between the wireless devices 102, 104. For example, the receiver can provide a received signal strength indicator (RSSI) as well as a frame error rate (FER) since it receives the acknowledge (ACK) signal when a frame is successfully transmitted to the other device. Likewise, the equalizer can provide a characterization of the channel impulse response because it is dynamically set to compensate the channel distortion effect in order to equalize the channel. These signals in combination represent the channel conditions that are generated by the modem 110 and fed to the logic circuit 114.

In particular, the signals of interest include: (a) RSSI, (b) symbol energy, (c) incoming FER, (d) outgoing FER, and (e) impulse response energy. In one aspect of the invention, the RSSI is provided directly by the receiver. In one aspect of the invention, the symbol energy is derived from the Barker decoder (e.g. in 802.11). In one aspect of the invention, the incoming FER is provided by the decoder. In one aspect of the invention, the outgoing FER is provided by the decoder based on correctly decoded ACK signals. In one aspect of the invention, the impulse response energy is provided by the equalizer.

Figure 6:
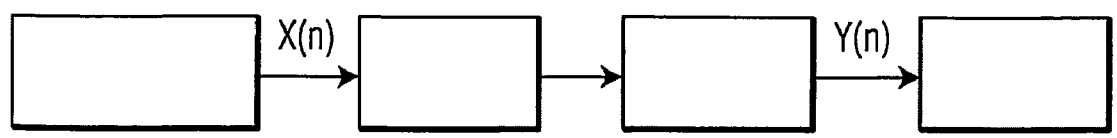
FIG. 6 is a chart showing an equalizer operating on a received signal according to an embodiment of the invention.

It may be useful to expand the description somewhat on the impulse response that is provided by the equalizer. The main role of an equalizer in a wireless receiver is to compensate or equalize the channel distortion to the transmitted signal so that the received signal can be easily decoded by the decoder. This relationship is shown in FIG. 6, in a chart showing an equalizer operating on a received signal. The equalized signal Y(n) can be written as follows:

$$Y(n)=X(n)*h(n)*w(n)$$

where X(n) is the transmitted signal, h(n) is the channel impulse response, w(n) is the impulse response of the equalizer and * is a convolution operation.

Ideally, if the channel effect on the transmitted signal can be fully compensated by the equalizer, the output signal Y(n) should be the delay and scaled version of X(n), which means:

$$h(n)*w(n)=C\delta(n-m)$$

where C is a constant (which can be assumed as 1 if Automatic Gain Control is implemented in the system), $\delta(n)$ is Kronecker delta function and m is the delay.

If the channel can be modeled as a finite impulse response (FIR) filter, we can to estimate the channel effect on the transmitted signal X(n) and we can observe the equalizer weight by using some metrics. Here, we propose to measure the power of the equalizer weight as:

$$P=\Sigma|w(j)|^2 \text{ for } j=0 \text{ to } N$$

where N is the length of the equalizer weight w(j).

The larger the value of P, the weaker the channel. The invention will set a lower fragmentation threshold for a weaker channel since there is a greater likelihood of losing long packets.

The fragmentation threshold parameter is calculated according to the following exemplary formula, where the input parameters are p1=RSSI, p2=symbol energy, p3=incoming FER, p4=outgoing FER and p5=Impulse Response Energy FrameN FragmentationThreshold=f1(p1$_{N-1}$−p1$_{N-2}$)+f2(p2$_{N-1}$−p2$_{N-2}$)+f3(p3$_{N-1}$−p3$_{N-2}$)+f4(p4$_{N-1}$−p4$_{N-2}$)+f5(p5$_{N-1}$−p5$_{N-2}$), where all functions f( ) are monotone increasing functions.

C. Method of Operation

Figure 7:
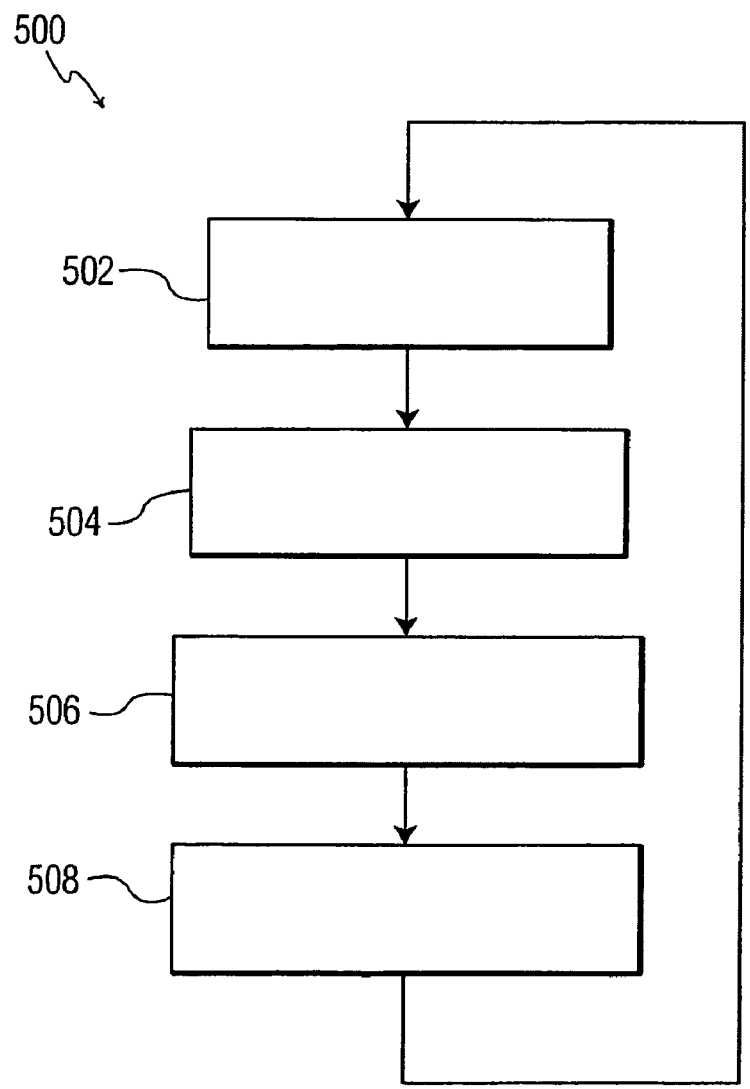
FIG. 7 is a flowchart showing the inventive operating steps according to an embodiment of the invention.

FIG. 7 is a flowchart showing the inventive operating steps according to an embodiment of the invention. In step 502, the fragmentation threshold is set to an initial number, which may be factory set, set by default on power up, set by a user, or set by other means. In step 504, the modem creates the channel signals related to the wireless communication channel. In step 506, the logic circuit calculates the new fragmentation threshold based on the selected channel signals and functions. In step 508, the logic circuit updates the fragmentation threshold parameter in the memory so that the transmitter framer can then use that parameter to fragment future frames. The logic circuit may also update additional parameters as desired in order to perform future calculations or to create a log of certain desired parameters.

D. Conclusion

Advantages of the invention include the ability to achieve higher wireless communication throughput based on dynamically setting of the communication parameters, for example, the fragmentation threshold. This dynamic setting increases communication quality by setting the fragmented packet length to an optimum threshold, thereby increasing throughput while reducing lost packets over the wireless link.

Having disclosed exemplary embodiments and the best mode, modifications and variations may be made to the disclosed embodiments while remaining within the subject and spirit of the invention as defined by the following claims.

What is claimed is:

1. A wireless communication device comprising: an input/output terminal; a memory configured to store parameters relevant to a wireless communication protocol and to store a fragmentation threshold; a modem coupled to the input/output terminal and the memory and configured to communicate using a wireless protocol over a wireless channel with at least one other modem based at least in part on the parameters stored in the memory and to use the fragmentation threshold to frame outgoing data packets; and a logic circuit coupled to the modem and the memory, wherein the logic circuit is configured to receive information related to wireless channel performance and update at least one parameter in the memory, wherein the information related to wireless channel conditions includes a received signal strength indicator, a symbol energy, an incoming frame error rate, an outgoing frame error rate and an impulse response signal energy, and wherein the logic circuit is further configured to periodically update the fragmentation threshold based at least in part on a function of the received signal strength indicator, the symbol energy, the incoming frame error rate, the outgoing frame error rate and the impulse response signal energy, wherein the fragmentation threshold of a frame is based on a function of the difference between received signal strength indicators of two previous frames, the difference between symbol energies of the two previous frames, the difference between incoming frame error rates of the two previous frames, the difference between outgoing frame error rates of the two previous frames and the difference between impulse response signal energies of the two previous frames.

2. The wireless communication device of claim 1, wherein the fragmentation threshold of a frame N can be expressed as:

$$\text{frame N fragmentation threshold} = f1(p1_{N-1}-p1_{N-2}) + f2(p2_{N-1}-p2_{N-2}) + f3(p3_{N-1}-p3_{N-2}) + f4(p4_{N-1}-p4_{N-2}) + f5(p5_{N-1}-p5_{N-2}),$$

where the functions f1, f2, f3, f4 and f5 are monotone increasing functions, $p1_{N-1}$ represents the received signal strength indicator of a previous frame N−1, $p1_{N-2}$ represents the received signal strength indicator of another previous frame N−2, $p2_{N-1}$ represents the symbol energy of the previous frame N−1, $p2_{N-1}$ represents the symbol energy of the previous frame N−2, $p3_{N-1}$ represents the incoming frame error rate of the previous frame N−1, $p3_{N-2}$ represents the incoming frame error rate of the previous frame N−2, $p4_{N-1}$ represents the outgoing frame error rate of the previous frame N−1, $p4_{N-2}$ represents the outgoing frame error rate of the previous frame N−p2, $p5_{N-1}$ represents the impulse response signal energy of the previous frame N−1 and $p5_{N-2}$ represents the impulse response signal energy of the previous frame N−2.

3. A method of communicating between wireless modems using a wireless protocol, comprising the steps of: storing parameters relevant to the wireless communication protocol in a memory coupled to a modem, wherein the storing step includes the step of storing a fragmentation threshold; communicating via the modem using the wireless protocol over a wireless channel with at least one other modem based at least in part on the parameters stored in the memory, wherein the communicating step includes the step of using the fragmentation threshold to frame outgoing data packets; and receiving information related to wireless channel conditions and updating at least one parameter in the memory, wherein the information related to wireless channel conditions includes a received signal strength indicator, a symbol energy, an incoming frame error rate, an outgoing frame error rate and an impulse response signal energy, and wherein the updating step includes the step of periodically updating the fragmentation threshold based at least in part on a function of the received signal strength indicator, the symbol energy, the incoming frame error rate, the outgoing frame error rate and the impulse response signal energy, wherein the fragmentation threshold of a frame is based on a function of the difference between received signal strength indicators of two previous frames, the difference between symbol energies of the two previous frames, the difference between incoming frame error rates of the two previous frames, the difference between outgoing frame error rates of the two previous frames and the difference between impulse response signal energies of the two previous frames.

4. The method of claim 3, wherein the fragmentation threshold of a frame N can be expressed as:

$$\text{frame N fragmentation threshold} = f1(p1_{N-1}-p1_{N-2}) + f2(p2_{N-1}-p2_{N-2}) + f3(p3_{N-1}-p3_{N-2}) + f4(p4_{N-1}-p4_{N-2}) + f5(p5_{N-1}-p5_{N-2}),$$

where the functions f1, f2, f3, f4 and f5 are monotone increasing functions, $p1_{N-1}$ represents the received signal strength indicator of a previous frame N−1, $p1_{N-2}$ represents the received signal strength indicator of another previous frame N−2, $p2_{N-1}$ represents the symbol energy of the previous frame N−1, $p2_{N-2}$ represents the symbol energy of the previous frame N−2, $p3_{N1}$ represents the incoming frame error rate of the previous frame N−1, $p3_{N-2}$ represents the incoming frame error rate of the previous frame N−2, $p4_{N-1}$ represents the outgoing frame error rate of the previous frame N−1, $p4_{N-2}$ represents the outgoing frame error rate of the previous frame N−2, $p5_{N-1}$ represents the impulse response signal energy of the previous frame N−1 and $p5_{N-2}$ represents the impulse response signal energy of the previous frame N−2.

* * * * *